6711X J. Shull,
Washing Machine,
Patented Aug. 19, 1831.
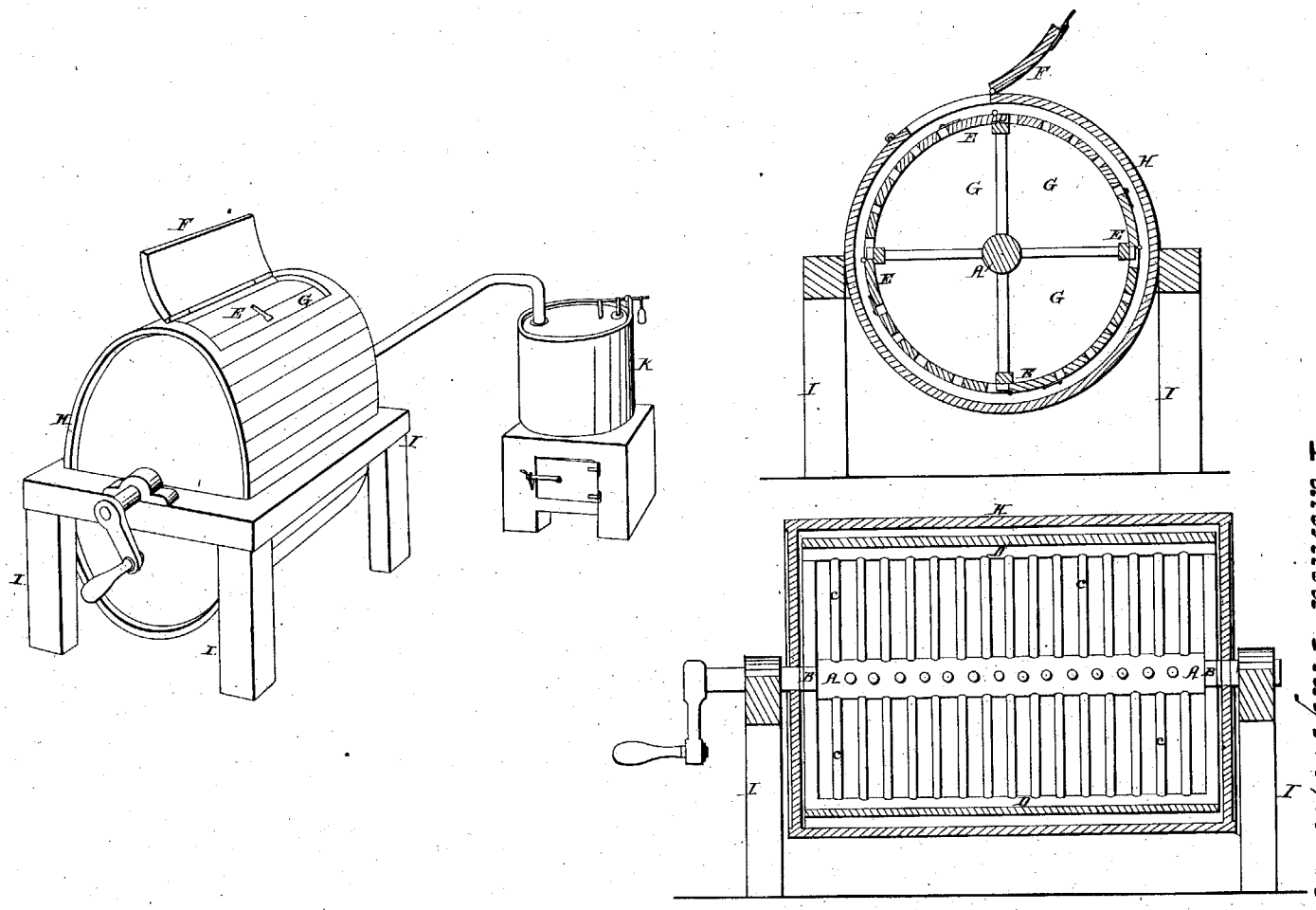
N. PETERS, PHOTO-LITHOGRAPHER, WASHINGTON, D. C.

6711X

Aug. 19, 1831

John Shull. New Petersburg - Ohio

Letters Patent.

The Schedule referred to in these Letters Patent, and making part of the same, containing a description in the words of the said John Shull himself, of his improvement in the Washing Machine.

To all to whom these presents shall come. Be it known, that I, John Shull, of New Petersburg, in the County of Highland, and State of Ohio, have invented a new and useful improvement in Machinery for Washing clothes, and that the following is a full and exact description of the construction and operation of said Machine, as invented or improved by me. I make a shaft of about thirty four inches in length and two or three in diameter, on or near the extremity of which, I affix circular pieces of timber of about twenty inches in diameter. I then make about thirty small arms or rods, with shoulders, being the length of the diameter of the heads of the open cylinder, which I [illegible] project alternately through the shaft in two rows, at a [illegible] regular distance from each other, which cross at right angles the centres of which are fastened to the centre of the shaft, [illegible] which pieces form four apartments. I then take four pieces of narrow timber, through which make holes sufficiently large to introduce the ends of the rods projecting through the shaft and then make them fast, at each extremity to the heads of the open cylinder. I then make four shutters, the length of the shaft, fastened with hinges to four bars or pieces of timber, extending from one end of the open cylinder to the other, & fastened to the four abovementioned bars [illegible] through which the rods project, by four battens. I then

[illegible]

fill up the circumference of the open cylinder [illegible]
with narrow pieces of timber for the purpose of con-
taining the garments to be washed, and of admitting
the water which is introduced into an outer cylinder,
constructed so as to be water-tight, and in which the
open cylinder is made to revolve upon iron gudgeons
fixed in the ends of the shaft, one of sufficient
length to project through one end of outer cylinder
so that a crank may be attached by a screw or square
on the end of the gudgeon. I make the outer cylinder
sufficiently large to admit of the open or inner [illegible]
cylinder running clear. The <u>outer</u> or <u>tight</u> cylin-
der shall be fixed in a frame so constructed as to
keep it firm, with an opening sufficiently large
to admit clothes for washing, and the opening of the
shutters of the inner cylinder.

To prepare clothes for washing soak or wet them
in water; introduce them into the open cylinder; [illegible]
fasten the shutter; then add five or six gallons of
warm water with sufficiency of soap to produce [illegible]
suds; then closing the shutter of the outer cylinder
which fits in such a manner as to prevent the escape
of either suds or steam, the latter of which, after having
been generated in a small boiler (say of the capacity of
five or six gallons) hung over a fire, either, being [illegible]
conducted there by a small tube, admitted into the
end of the outer cylinder, through a small aperture,
between the centre and top.

I affix a guard upon the end of the tube next
the head of the cylinder, to prevent its interference with
the inner works. The clothes, after having been subjected
to the heat of the steam and action of the water, (the
last being effected by the revolutions of the open cylinder)

a sufficient length of time to prepare them for rinsing, the suds are let off, by means of an aperture in the bottom of the outer cylinder, previously closed by a com=mon stopper, and clean water introduced into the machine, for the purpose of rinsing, which is performed in the same manner as washing. When the clothes are ready to be taken out the safety valve of the boiler being first opened for the escape of the steam, the shutter of the outer and those of the inner cylinders, are suc=cessively open and the clothes taken out.

I claim as my invention, the formation of the revolving open cylinder; and the introduction of the steam into the same, in the manner described

Witnesses
William Keys
W. L. Keys

John Shute

800 [illegible]